June 20, 1961 J. A. GAYLORD 2,988,797
CANOPY RELEASE MECHANISM
Filed April 4, 1960 2 Sheets-Sheet 1

INVENTOR.
JOHN A. GAYLORD
BY
Leonard D. Weinberg
ATTORNEY.

June 20, 1961  J. A. GAYLORD  2,988,797
CANOPY RELEASE MECHANISM
Filed April 4, 1960  2 Sheets-Sheet 2
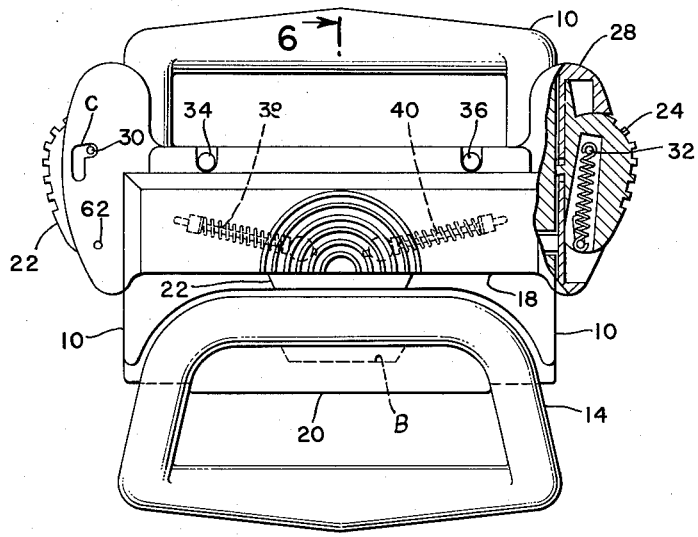
FIG. 4.
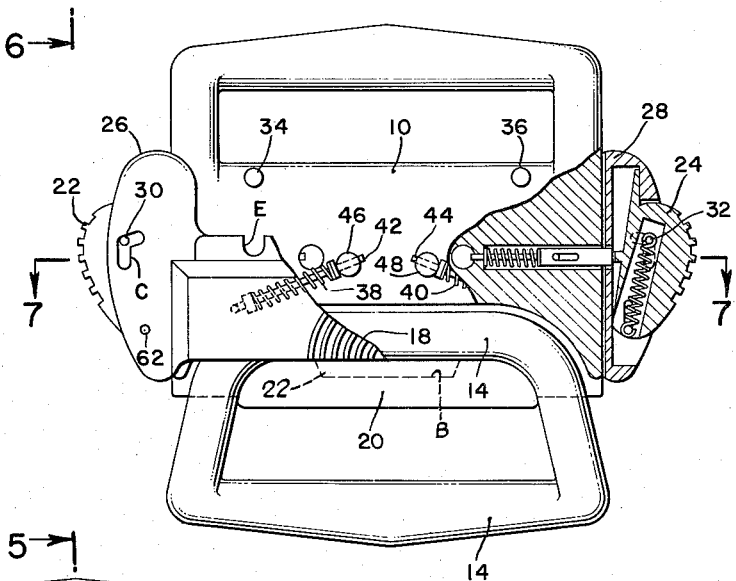
FIG. 3.
FIG. 2.
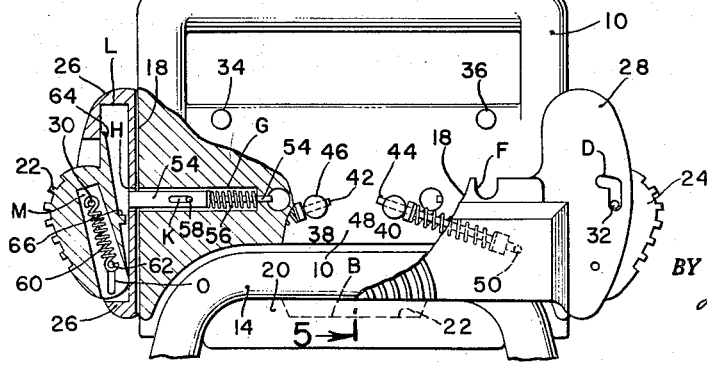
INVENTOR.
JOHN A. GAYLORD
BY
Leonard D. Weinberg
ATTORNEY.

United States Patent Office 2,988,797
Patented June 20, 1961

2,988,797
CANOPY RELEASE MECHANISM
John A. Gaylord, 360 Quietwood Drive, San Rafael, Calif.
Filed Apr. 4, 1960, Ser. No. 19,810
1 Claim. (Cl. 24—230)

This invention relates to a parachute canopy release mechanism adapted to be attached between a parachute canopy webbing and a parachute harness, and more particularly to a parachute canopy release mechanism containing manually operated release means for uncoupling the canopy from the harness. The invention is characterized by a novel release mechanism which can be easily released by a single deliberate hand motion, but which at the same time cannot be accidentally released. The release mechanism contains two independently movable release buttons each movable in two different directions, two independently operable latch assemblies each responsive to one release button to unlatch when the corresponding release button has been moved in both directions, and a harness lock slide which is movable to uncouple the canopy when both latch assemblies are unlatched at the same time. The canopy remains locked to the harness until the release buttons have been simultaneously moved in both directions, which cannot happen accidentally, but which can be easily accomplished by a single deliberate hand motion.

In the construction of parachute release mechanisms two contradictory requirements must be reconciled: (1) The release mechanism must be extremely easy to operate deliberately, and (2) it must be very difficult to operate accidentally. The conditions under which the parachute release mechanism is used make the reconciliation of these requirements very difficult. The parachutist usually wears heavy gloves or mittens to protect his hands. He might be injured before his escape from the aircraft or on reaching the ground. And he might be submerged in cold water, or dragged along the ground by high winds, while he is attempting to operate the release mechanism. Therefore the release mechanism must be placed close to the natural position of the parachutist's hand; the release button must be so prominent it can be identified by a glove hand which may be numbed or wounded, and the release motion must be one which can be quickly and easily performed while the parachutist is dragged, at high speed, over rough terrain.

On the other hand, it is certainly undesirable for the release mechanism to be operated accidentally while the parachutist is descending, but with an easy release mechanism this is hard to avoid. The parachutist receives a violent jerk when his parachute opens, and this might throw his hand against the prominent release button. He often has to manipulate the parachute shroud lines to direct his descent, and in doing so he might brush against the release button, particularly when his gloved hands are numbed from high altitude coldness. He may encounter violent updrafts or winds in the midst of his descent and he might be in a highly agitated mental state, particularly if he is approaching a forbidding stretch of terrain under high winds. In the latter case he might place his hand on the release button while he is still dozens or hundreds of feet in the air, to insure speedy release when he reached the ground, and a sudden gust of wind could cause him to inadvertently operate the release.

The prior art canopy release mechanisms have never successfully reconciled these conflicting requirements. Those which were easy to operate were unsafe, and those where safe, were hard to operate. Examples of the latter type are the Capewell Release used by the U.S. Air Force, and the Gaylord Release (U.S. Patent #2,802,252), used by the U.S. Navy. The Capewell Release contained a first stage safety cover which had to be pulled away before the release button could be reached. When released, the safety cover projected about three inches from the release mechanism, and when released in drag conditions it lacerated the parachutist's head and neck. After releasing the safety cover it was necessary for the parachutist to remove his hand from the safety cover, locate the release buttons by feel, and operate the release buttons to uncouple the canopy. This operation could be performed by a trained man under normal conditions, but under drag conditions it was very difficult, and when the parachutist's hand were numbed with cold it was next to impossible. The Gaylord Release contained two pairs of release buttons, a first stage release pair and a second stage release pair. To operate the release, the first stage buttons were depressed and a first stage safety collar was lowered. Then the first stage buttons were released and the second stage release buttons were depressed and a harness lock slide was lowered to release the canopy. Because of the two movements required, the Gaylord Release was also very difficult to operate under drag conditions. The Capewell and Gaylord Releases were both safe, but they were both difficult to operate and as a result many parachutists were injured by being dragged along the ground after landing in a high wind.

In accordance with this invention the disadvantages of these prior art release mechanisms have been overcome, and a novel release mechanism has been devised which is at the same time safe and easy to operate. This invention employs two large release members located on opposing sides of the release mechanism. To unlatch the release mechanism the buttons are simultaneously moved upwardly toward the canopy and then inwardly toward each other. When the release mechanism is unlatched the canopy can be uncoupled from the harness by an upward pressure on the release members. Thus with this invention the release operation is a single, natural hand motion: the hand is placed on the release mechanism with the thumb on one side and fingers on the other, and the hand is moved upwardly with the thumb and fingers pressing inwardly on their respective release members. The release members are so large that they cannot be missed when the hand is placed over the release mechanism, and only modest inward and upward pressure is required to operate the release. Therefore this invention can be easily operated under the worst of conditions since it requires only that the parachutist locate the entire mechanism with his hand and execute a single, natural push-squeeze motion.

But at the same time it is extremely unlikely that the release operation could be performed accidentally. Neither release member can operate by itself to unlatch the release; both must be operated simultaneously. Therefore if the parachutist's hand should inadvertently strike either release button the device would remain locked, even though the release button were moved both upwardly and inwardly. It is virtually impossible for the release operation to be completed without having the parachutist's hand placed over the device with the thumb on one side and the fingers on the other.

Furthermore, if the parachutist should prematurely place his hand in the release position, it is very unlikely that a sudden updraft could cause inadvertent release because the updraft would move the parachutist's hand downwardly instead of upwardly as required for release. And even if the parachutist's hand were inadvertently moved upwardly, the device would remain locked unless the upward movement were accompanied by a simultaneous inward pressure on both release members. Therefore, although the canopy release mechanism of this invention can be easily operated by a single, natural hand movement, it is extremely safe in that the required motion is virtually impossible to duplicate accidentally or inadvertently.

Accordingly, one object of this invention is to provide a parachute canopy release mechanism which is easy to operate deliberately under adverse conditions but which is difficult to operate inadvertently under any conditions.

Another object of this invention is to provide a parachute canopy release mechanism which is simple and sturdy in construction and reliable in operation.

Other objects and advantages of this invention will be apparent to those skilled in the art from the following description of one illustrative embodiment thereof, in connection with the attached drawings, in which:

FIG. 2 is a cut-away elevation view showing the embodiment of FIG. 1 in its rest or locked condition.

FIG. 3 is a cut-away elevation view showing the embodiment of FIG. 1 with both release members at the uppermost limit of their upward motion.

FIG. 4 is a cut-away elevation view showing the embodiment of FIG. 1 in its open or released position.

Figures 6, 7:
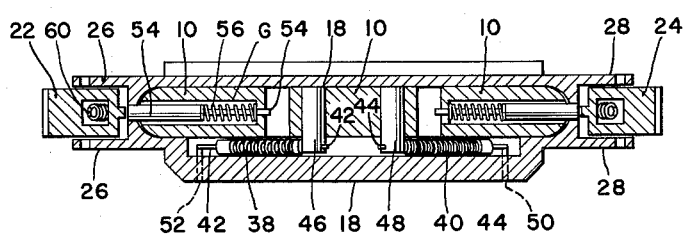
FIG. 6 is a vertical section taken on the line 6—6 of FIG. 4.

And FIG. 7 is a horizontal section taken on the line 7—7 of FIG. 3.

Figure 1:
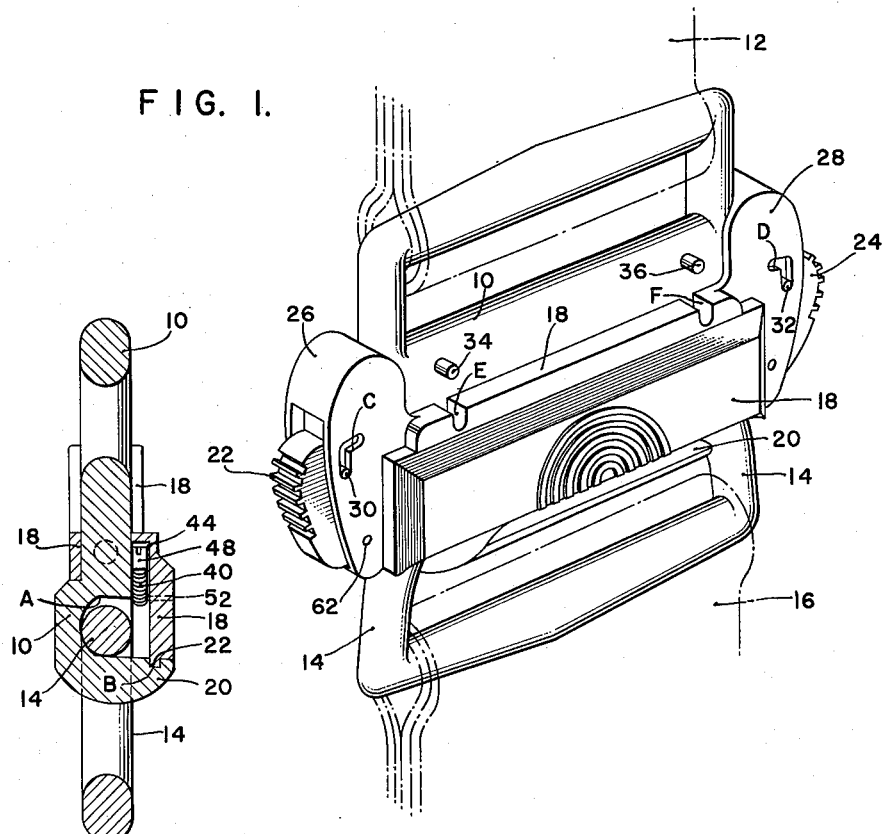
FIG. 1 is a perspective view showing one embodiment of the invention connected between a parachute canopy webbing and a parachute harness ring.
Figure 5:
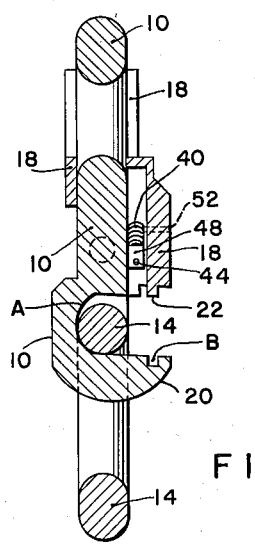
FIG. 5 is a vertical section taken on the line 5—5 of FIG. 2.

Referring to FIGS. 1, 5 and 6, one embodiment of the invention comprises a body member 10 adapted to be permanently attached to a parachute canopy webbing 12 and removably attached to a parachute harness ring 14, which is attached to a parachute harness webbing 16. Parachute ring 14 seats in a harness recess A formed in the lower portion of body member 10, and is securely locked in harness recess A by a harness lock slide 18 which is movable on body member 10 between a first position closing harness recess A (FIG. 5) and a second position opening harness recess A (FIG. 6). Movement of the slide in the first position is limited by a lower lip 20 projecting outward from the lowermost edge of body member 10. In the first position a downwardly projecting tongue 22 of harness lock slide 18 engages in a tongue groove B cut in the upper surface of lower lip 20. When tongue 22 is engaged in tongue groove B (FIG. 5) harness ring 14 is securely locked within harness recess A.

Harness lock slide 18 is normally latched in the first position by two independent latch assemblies which will be described later. The latch assemblies are responsive to two external release members 22 and 24, which are mounted on opposing sides of harness lock slide 18 in housings 26 and 28. Housings 26 and 28 are rigidly attached to harness lock slide 18, and release members 22 and 24 are movable within their respective housings both upwardly toward canopy webbing 12 and inwardly toward each other. The movement of release members 22 and 24 is guided by guide pins 30 and 32, which ride in guide channels C and D cut into housings 26 and 28. Guide channels C and D each comprise two arms; one arm being parallel with the adjacent side of body member 10, and the other arm being approximately perpendicular to the adjacent side of body member 10. Each release member is spring loaded both downwardly and outwardly, and normally rests with its respective guide pin abutting against the closed end of the parallel arm of the corresponding guide channel, as shown in FIG. 1.

Each release member, when moved both upwardly and inwardly, serves to unlatch its corresponding latch assembly, and when both latch assemblies are unlatched at the same time harness lock slide 18 can be moved from the closed position (FIG. 5) to the open position (FIG. 6). The movement of harness lock slide 18 in the closed position is limited by abutment pins 34 and 36 on body member 10. Abutment pins 34 and 36 engage corresponding abutment recesses E and F cut into the top of harness lock slide 18.

Harness lock slide 18 is spring loaded to remain in either of its two positions by two compression springs 38 and 40 (FIG. 7) which are supported by rigid arms 42 and 44. Rigid arms 42 and 44 are pivoted at one end to body member 10 by swivel pins 46 and 48, and at the other end to harness lock slide 18 by swivel pins 50 and 52. The pivot points of the two rigid arms 42 and 44 are placed such that both arms will be parallel with the horizontal axis of body member 10 when harness lock slide 18 is between its closed and open positions. Therefore, the arms will be inclined downward when harness lock slide 18 is in the closed position (FIG. 5), and will be inclined upward when harness lock slide 18 is in its open position (FIG. 6). Compression springs 38 and 40 will thus exert a downward force on harness lock slide 18 when it is in its lowermost position, and an upward force when it is in its uppermost position. This holds harness lock slide 18 in place when it is moved to either the closed or open position. As a safety feature, the pivot points are preferably placed so that the greatest holding force is applied in the closed position, and the strength of compression springs 38 and 40 are chosen to hold harness lock slide 18 closed so that a positive upward force is required to move it from the closed to the open position.

The two independently operable latch assemblies which hold harness lock slide 18 latched in its closed position are shown in FIGS. 2, 3, 4 and 7. The left hand latch assembly (FIG. 2) comprises a latch plunger 54 which is slideable in a latch channel G cut into body member 10. Latch plunger 54 is spring loaded outwardly by a compression spring 56 to bear against the adjacent inner side of harness lock slide 18. When slide 18 is in the closed position, latch plunger 54 engages a latch opening H cut into the side of harness lock slide 18 and prevents movement of slide 18 from its closed position. The outward movement of latch plunger 54 is limited by a stop pin 58 which rides in a stop channel K cut into latch plunger 54. Stop pin 58 and stop channel K are arranged such that latch plunger 54 does not protrude from latch opening H beyond the side wall of harness lock slide 18. This is important in the operation of release member 22, as will be explained below.

As shown in FIG. 2, release member 22 is movably mounted in a recess L cut into housing 26. Release member 22 is spring biased downwardly and outwardly by an expansion spring 60 which fits within a spring channel M cut into release member 22. Expansion spring 60 is attached at its upper end to guide pin 30, which is rigidly attached to release member 22, and at lower end to housing 26 via pin 62, which rides in a channel O cut in release member 22. In addition to attaching spring 60 to housing 26, pin 62 also functions as the pivot point for the inward movement of release member 22. Release member 22 is held in housing 26 against the outward force of spring 60 by a retaining projection 64, and is limited in downward movement by the abutment of pin 62 against the top of channel O. On the inner side of release member 22 is a projecting nipple 66, which is normally held below latch opening H by spring 62, but which is moved into central alignment with latch opening H when release member 22 is moved to its uppermost position against the force of spring 60. This position is illustrated for both latch assemblies in FIG. 3.

Referring to FIG. 3, when release member 22 is moved to its uppermost position guide pin 30 will be aligned with the bend of guide channel C and, as can be seen in the section of the right hand latch assembly, nipple 66 will be centrally aligned with latch opening H, with pin 62 abutting on the bottom of channel O. If release member 22 is then moved inwardly latch pin 54 will be forced out of latch opening H and the left hand latch assembly will be unlatched.

As can be seen in FIGS. 2 and 3, the right hand latch assembly is a mirror image of the left hand latch assembly, and operates in exactly the same manner. It can also be seen in FIGS. 2 and 3 that harness lock slide 18 will be latched in the closed position when either latch assembly is latched, and will not be free for movement until both latch assemblies are simultaneously unlatched, which requires a combined upward and inward pressure on both release members at the same time. When both latch assemblies have been unlatched, as shown in FIG. 4, harness lock slide 18 can be moved upwardly against the force of springs 38 and 40 to its open position (FIGS. 4 and 6). In the open position harness recess A is uncovered and harness ring 14 moves down the slightly inclined bottom of recess A to uncouple from body member 10, which is then pulled clear by canopy webbing 12 to collapse the parachute canopy.

From the foregoing description it will be apparent that this invention provides a parachute canopy release mechanism which is easy to operate deliberately under adverse conditions but which is difficult to operate inadvertently under any conditions. It will also be apparent that this invention provides a parachute canopy release mechanism which is simple and sturdy in construction, and reliable in operation. And it should be understood that this invention is by no means limited to the specific structure disclosed herein, since many modifications can be made in the structure disclosed without departing from the basic teaching of this invention. For example, the latch assemblies need not be formed from plungers as shown; any suitable latch mechanisms can be employed provided they are independent of each other and responsive to an upward and inward pressure on the corresponding release member. In addition, many different release member assemblies can be constructed without departing from the basic push-squeeze form contemplated in this invention. These and many other modifications will be apparent to those skilled in the art, and this invention includes all modifications falling within the scope of the following claim:

I claim:

In a parachute canopy release mechanism containing a body member, a harness lock slide movable on the body member between a first position closing the canopy release mechanism and a second position opening the canopy release mechanism, a latch plunger in the body member spring loaded to press against the inside surface of the harness lock slide, and a latch opening cut in the harness lock slide to receive the latch plunger when the harness lock slide is in said first position, the improvement comprising a cavity cut into the harness lock slide around the latch opening, a release member movable within the cavity parallel with and perpendicular to the sides of the body member, a nipple projecting from one side of the release member toward the body member, an expansion spring connected between the release member and the harness lock slide, the expansion spring being normally inclined at a small acute angle to the adjacent side of the body member, the nipple being held by the spring out of alignment with the latch opening, and the release member being manually movable against the force of the spring to bring the nipple into alignment with the latch opening, and a guide pin projecting from the release member at right angles to said nipple, and a guide channel cut into the harness lock slide to receive the guide pin, and the guide channel containing two arms approximately perpendicular to each other, one arm of the guide channel being parallel with the adjacent side of the body member and the other arm thereof being approximately perpendicular to the adjacent side of the body member, and the guide pin being normally pressed against the closed end of said one arm by the urging of said spring.

References Cited in the file of this patent

UNITED STATES PATENTS

| | | |
|---|---|---|
| 2,870,509 | Gaylord | Jan. 27, 1959 |
| 2,902,737 | Moran | Sept. 8, 1959 |